United States Patent [19]

Naumec et al.

[11] Patent Number: 5,085,313

[45] Date of Patent: Feb. 4, 1992

[54] SEAL ASSEMBLY

[75] Inventors: John R. Naumec, Willimantic; Joseph E. Faucher, East Hartford, both of Conn.

[73] Assignee: United Technologies Corporation, Hartford, Conn.

[21] Appl. No.: 609,864

[22] Filed: Nov. 7, 1990

[51] Int. Cl.⁵ .............................................. B65G 33/26
[52] U.S. Cl. .................................... 198/659; 198/673; 198/676; 277/53
[58] Field of Search ...................... 198/676, 673, 659; 277/53, 55, 56, 57

[56] References Cited

U.S. PATENT DOCUMENTS

| 305,142 | 9/1884 | Burkhardt | 198/676 X |
| 4,496,086 | 1/1985 | Duchadeau | 198/659 X |
| 4,526,509 | 7/1985 | Gay et al. | 277/53 X |

Primary Examiner—D. Glenn Dayoan
Attorney, Agent, or Firm—Gene D. Fleischhauer

[57] ABSTRACT

A seal assembly 74 used between two members 42, 45 which are capable of relative movement is disclosed. Various construction details are developed which enable the seal assembly to accommodate other movement in a direction perpendicular to the direction of movement while accommodating movement in the direction of movement. In one embodiment, the seal assembly extends between two circumferentially extending surfaces which face each other. The seal assembly is formed of a plurality of circumferentially spaced seal elements 74 having flaps 116 which are radially and circumferentially flexible but relatively stiff in the axial direction in comparison to the radial and circumferential flexibility.

6 Claims, 4 Drawing Sheets

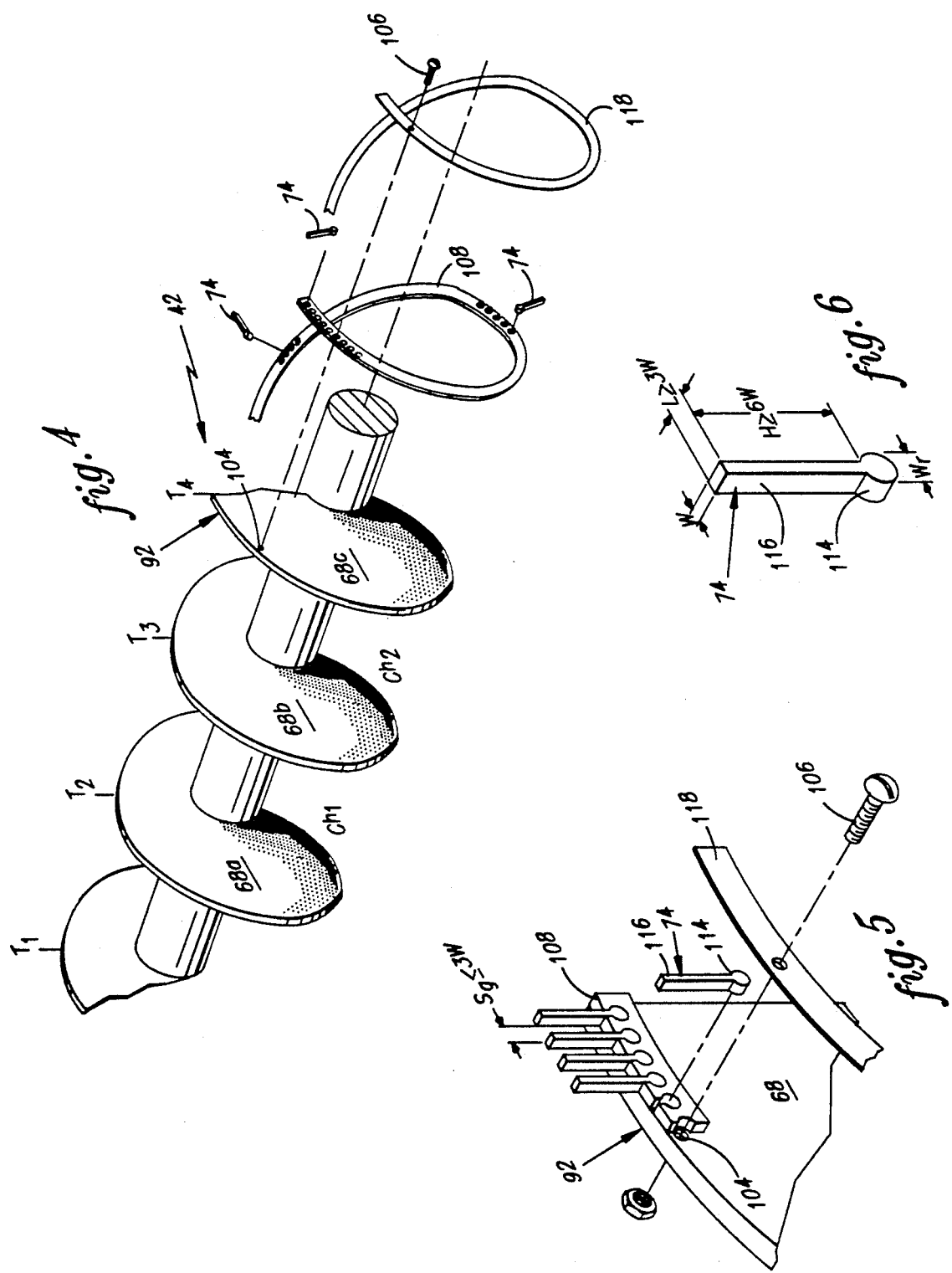

SEAL ASSEMBLY

This invention was made under a Government contract and the Government has rights herein.

TECHNICAL FIELD

This invention relates to a seal assembly for use between two members capable of relative movement. Movement may be rotational, radial or axial between the members. This invention was developed for use in the field of metal finishing, but has applications to other fields.

BACKGROUND OF THE INVENTION

A screw conveyor used in a novel way for metal finishing was filed of even date by the Applicants of the present invention. A screw conveyor typically includes a casing which bounds a cavity for receiving material. An auger or screw mechanism having a helicoid-type blade is disposed axially in the chamber and rotates with respect to the casing. The helicoid-type blade of the conveyor acts as a continuous inclined plane for forcing material through the screw conveyor.

In some applications, no seal is required between the blade and the casing of the screw conveyor. In other applications, a seal is provided which prevents communication between material disposed on either side of the blade as the blade moves into proximity with the bottom portion of the casing. The seal prevents the transfer of material from one chamber to the next.

In some embodiments, it may be desirable to permit fluid to flow from chamber to chamber through the seal assembly as material is propelled through the screw conveyor. It is desirable on some occasions to change the porosity of the seal or to replace the seal with a different seal for use in a new application. It is also desirable to replace portions of the seal assembly which are damaged by contact with foreign objects as the material is transported or which are damaged by wear which occurs over time but which occurs in a particular segment of the seal assembly for one reason or another. In both of these cases, it is desirable to easily replace portions or the seal assembly without removing the entire auger from the machine.

Accordingly, scientists and engineers working under the direction of Applicants' assignee have sought to develop a seal assembly which extends between members capable of relative movement which is easily replaceable and which facilitates replacing damaged portions of the seal assembly.

DISCLOSURE OF THE INVENTION

According to the present invention, a seal assembly extending between two members capable of relative movement and separated by a gap G which may vary in size is a plurality of seal flaps which extend radially outwardly from one of the members which is formed of a resilient material and which is flexible in the direction of movement and relatively stiff in any other direction.

In accordance with one detailed embodiment of the invention, the seal assembly is disposed between two members capable of relative rotational movement; one of the members has a plurality of slots, each slot having an associated seal element extending radially outwardly at the slot from the rotating member and having a root which is adapted to slidably engage the slot to permit replacement of one or more of the plurality of seal elements.

A primary feature of the present invention is a pair of members capable of relative movement with respect to each other. A seal assembly extends between the members and is attached to one member and slidably engages the second member. In one embodiment, the first member is adapted by a plurality of slots to each receive an associated seal element from a plurality of seal elements. Each seal element has a root which is adapted to engage the slot and a flap which extends radially outwardly from the root. The flap is axially stiff, radially compliant and circumferentially flexible The seal elements may be spaced apart by a spacing $S_g$ in the circumferential direction which varies. Changing the spacing between adjacent seal members changes the amount of sealing provided by the seal members and adjusts the porosity of the seal member. Seal members may be selectively removed to adjust the spacing leaving some slots empty. Alternatively, seal elements which have been damaged may be replaced, maintaining the porosity of the seal assembly.

A principal advantage of the present invention is the ease of modifying or repairing a seal assembly which results from the replaceability of single elements of the seal assembly. An advantage is the porosity of the seal assembly which may be adapted to different uses in particular applications which results from the variability of the spacing between adjacent seal elements. Another principal advantage is the accommodation of significant changes in the gap G between seal elements ranging in one embodiment from a clearance which is approximately one-fourth of the length of the seal assembly to a clearance which is equal to the radial length of the seal assembly and results from the radial flexibility of the seal assembly. Under operative conditions, the seal assembly is deflected away from the direction of movement and compressed radially between the elements requiring sealing. This has particular advantage in the field for screw conveyors where the clearances between the helicoid-like blade and the casing may vary with time in the radial direction as a result of vibrations or wear.

The foregoing features and advantages of the present invention will become more apparent in light of the following detailed description of the best mode for carrying out the invention and the accompanying drawings.

BRIEF DESCRIPTION OF DRAWINGS

FIG. 4 is a partial perspective view in exploded fashion of a helicoid-type blade and shaft employed in the apparatus shown in FIG. 1;

FIG. 5 is an exploded partial perspective view of the rim region of a blade showing a seal assembly;

FIG. 6 is a partial perspective view of a seal element of the seal assembly;

BEST MODE FOR CARRYING OUT THE INVENTION

Figure 1:
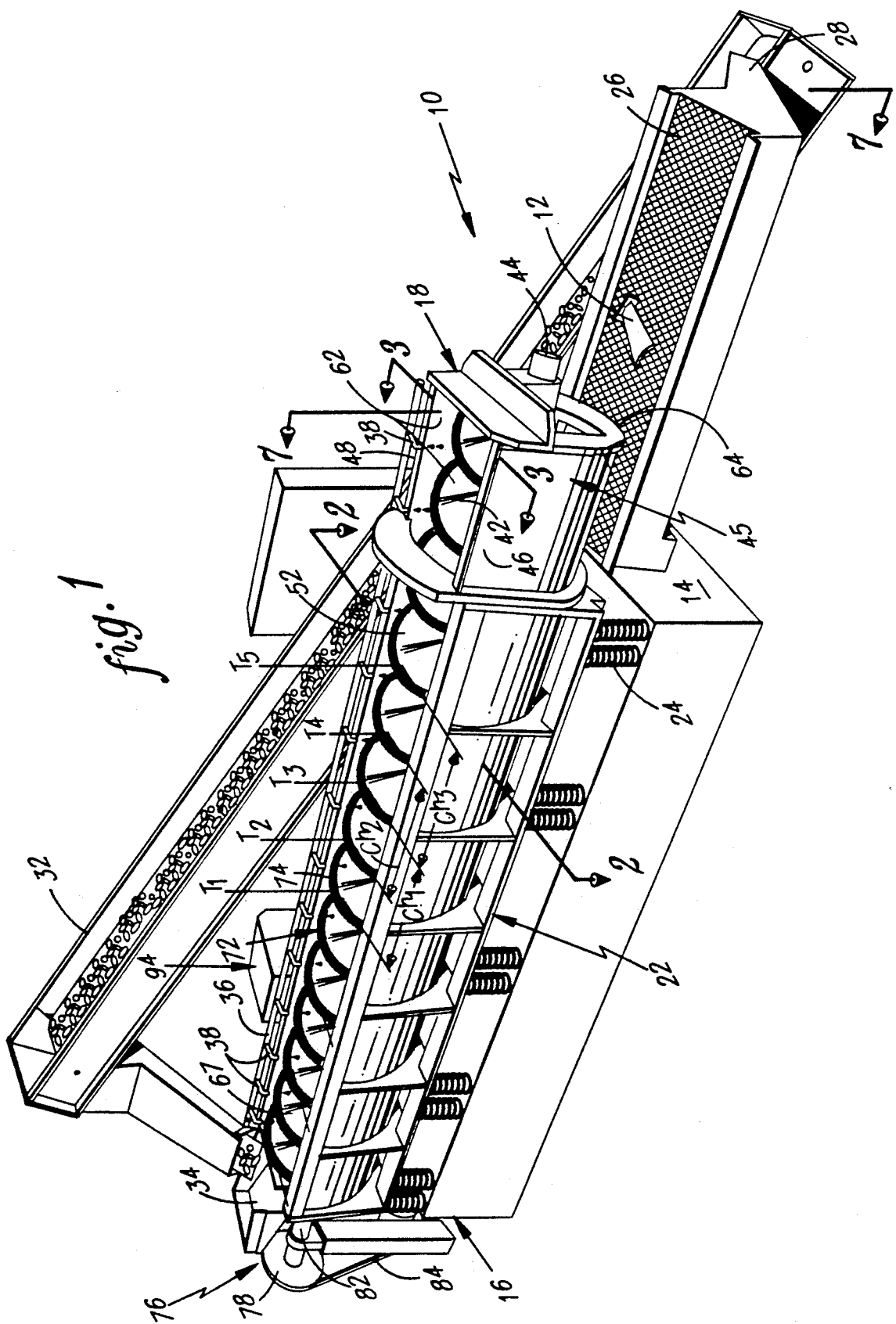
FIG. 1 is a side elevation view of an apparatus for providing a finish to articles as the articles are transported from one location to a second location.

FIG. 1 is one embodiment of the present invention employing a conveyor type apparatus 10 for applying a finish to a plurality of articles, such as a plurality of castings for turbine blades 12. The apparatus has a base 14, a first end 16 at a first location and a second end 18 at a second location.

A screw conveyor 22 extends between the ends 16, 18. Means are provided for elastically supporting the screw conveyor, as represented by a plurality of springs 24, extends between the base 14 and the screw conveyor.

Means are provided for receiving finishing media and a turbine blade from the screw conveyor and separating the blade from the media, as represented by the vibrating screen 26 and chute 28. The screen and chute are in flow communication with the second end 18 of the screw conveyor.

Means are provided for returning the finishing media to the first end of the apparatus for re-use in subsequent volumes of media, as represented by the belt conveyor, extends from the chute to the first end of the screw conveyor.

Means are provided for supplying predetermined volumes of media to the screw conveyor and for receiving media from the belt conveyor. One example of such means is the inlet hopper attached to the first end of the casing. The inlet hopper has a predetermined volume. As the finishing media fills the hopper a level sensor (not shown) determines when a predetermined height of media is reached. An article to be finished, such as the turbine blade, is automatically dropped into place (such as by a robot, not shown) and the hopper is opened to discharge the media and the turbine blade into the first end 16 of the screw conveyor.

Means are provided for providing fluid at spaced apart locations on the screw conveyor 22 as represented by the pipes 36, are in fluid communication with a source (not shown) of finishing compound and solvent, such as water, for diluting of the finishing compound. The means for supplying fluid to the screw conveyor has a plurality of outlets 38 for providing the fluid at a predetermined rate (usually a trickle) to the screw conveyor.

The screw conveyor has an auger 42 having a shaft 44 which extends axially. A casing 45 is disposed about the shaft. The casing is attached to the springs 24. The shaft has an axis of rotation $A_r$.

The casing 45 extends longitudinally. The casing has a first sidewall 46 and a second sidewall 48 spaced laterally from the first sidewall leaving an opening or cavity 52 therebetween. A first end member 54 and a second end member 56 extend laterally between the sidewalls to rotatably engage the axially extending shaft 44. The casing has an inner surface 58 formed by a coating of resilient material. The resilient material also coats the auger to provide a resilient surface 62 to the auger. One example of a satisfactory material is a Urethane coating available from the Ultramatic Equipment Company, 848 Westgate Drive, Addison, Ill., which provides a coating at the time of manufacture of the casing. The Urethane coating has a durometer (hardness) reading of 90.

A bottom section 64 extends circumferentially about the axis $A_r$ from the first sidewall 46 to the second sidewall 48. The bottom section has a cylindrical shape over an arc which is less than or equal to one-hundred eighty degrees. The sidewalls and bottom section are formed as a single piece or may be joined so that the sidewalls and bottom section are integral with each other. The bottom section and sidewalls form the open trough-like casing for receiving predetermined volumes of media 30 and the turbine blade 12 and for supporting the media 30 and turbine blade as the media carries the turbine blade through the screw conveyor.

The auger 42 rotatably engages the end sections of the casing. The auger has a helicoid-like blade 66 integral with the shaft 44 that is, generally having a spiral or helicoid shape, including spiral shapes having variations in height or spacing between crests $T_1$, $T_2$, etc. The helicoid-like blade extends axially through the casing with its plurality of crests $T_1$, $T_2$, $T_3$, $T_4$ and $T_5$. A spiral-like groove extends between the crests of the blade. As will be shown in connection with FIG. 2, the bottoms 68 of the blade in combination with the bottom of the casing forms a plurality of chambers, as represented by the chambers $Ch_1$, $Ch_2$, $Ch_3$.

A resilient seal assembly 72 extends from the helicoid-like blade 66 to the inner surface 58 of the casing over at least the arcuate portion of the casing. The seal has a plurality of individual seal elements 74.

Means 76 are provided for rotating the auger 42 at a predetermined speed. It is disposed at the first end 16 of the apparatus 10 and is drivingly attached to the shaft 44 of the auger. The means for rotating the auger might include, for example, a toothed gear 78, a chain 82 which engages the toothed gear, and a means for driving the chain such as a motor (not shown). A shaft 84 extends from the toothed gear. A double universal joint (not shown) is attached to the shaft of the toothed gear and the shaft of the auger. The universal joint accommodates misalignment of the two shafts as might occur during vibratory movement of the screw conveyor. The means also acts as a brake should that be necessary to control the speed of the auger.

Figure 2:
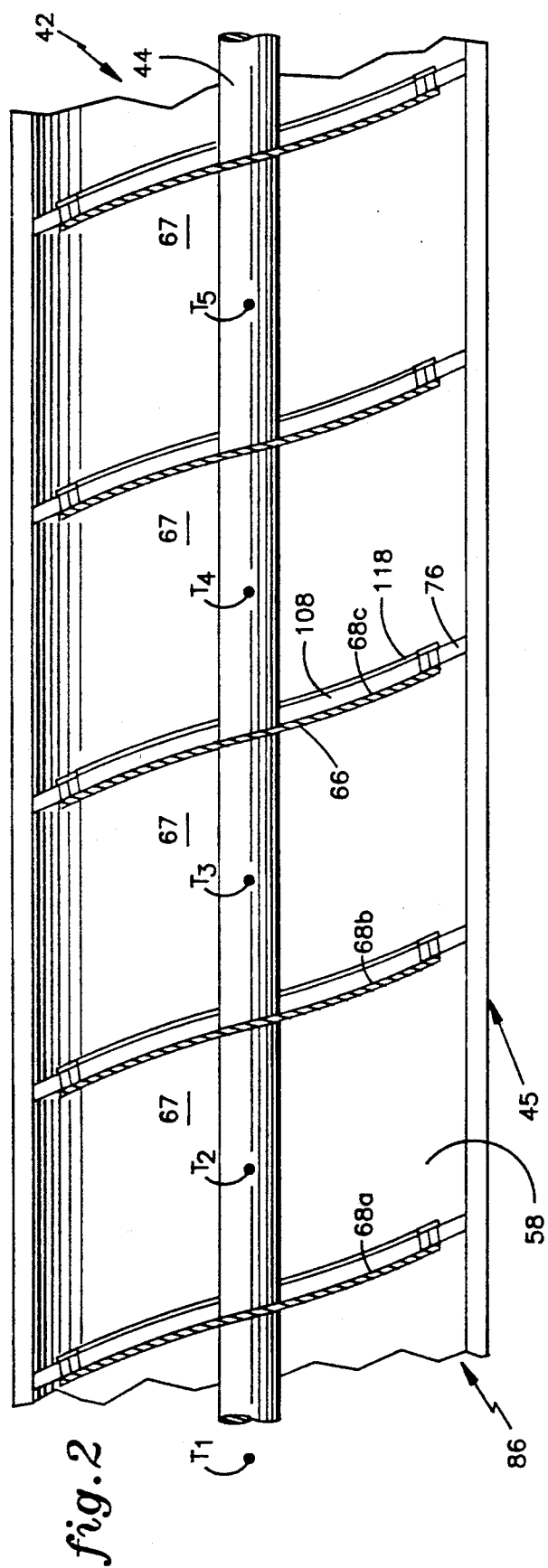
FIG. 2 is a view taken along the lines 2—2 of FIG. 1 partly in cross-section and partly broken away.

FIG. 2 is a section taken along the lines 2—2 of FIG. 1 with a portion of the structure broken away for clarity to illustrate the relationship between the bottoms 68 of the helicoid-type blade 66 and the bottom portion 86 of the casing. As shown in FIG. 1 and FIG. 2, the helicoid-like blade has a plurality of crests $T_1$, $T_2$, $T_3$, $T_4$, $T_5$ and the spiral-like groove 67 which extends between the crests of the blade. The portion of the blade at the bottom 68 of the blade between each crest and the next two adjacent crests (for example $T_1$, $T_2$, $T_3$) form two angularly extending ends 68a and 68b to chamber $Ch_1$. Each chamber adapts the screw conveyor to receive a predetermined volume of finishing media 30 which is disposed in each chamber. The sides of the chamber are bounded by the bottom portion 86 of the casing 45 adjacent to the chamber which extends between the ends of the chamber. In a like manner, the portion of the bottom 68b of the blade between the crests $T_2$ and $T_3$ and 68c between the adjacent pair of crests $T_3$ and $T_4$ define the adjacent chamber $Ch_2$. Thus the helicoid-type blade and the casing define a plurality of separate chambers at the bottom portion of the casing and the bottom portion of the blades.

The resilient seal assembly 72 extends in a generally radial direction from the helicoid-type blade 66 and between the blade 66 and the inner surface 58 of the casing to engage the bottom portion of the casing 45.

Figure 3:
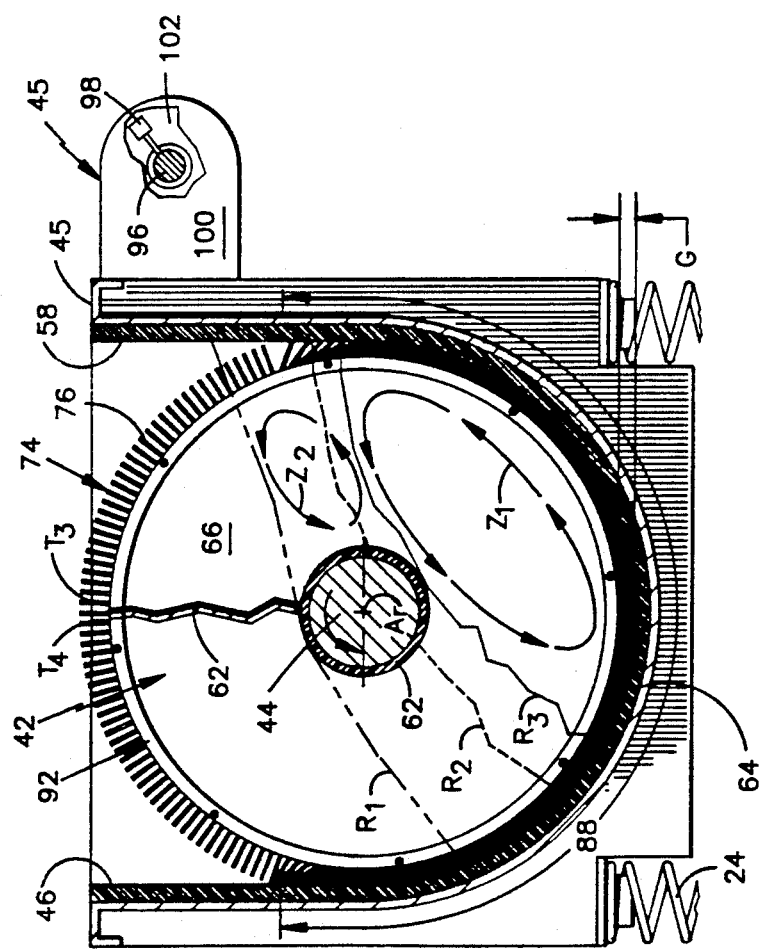
FIG. 3 is a view generally taken along the lines 3—3 of FIG. 1 illustrating circulation zones in different levels of media with portions of the apparatus broken away for clarity.

FIG. 3 is a section taken generally along the lines 3—3 of FIG. 1 with a portion of the helicoid-type blade 66 broken away to show two adjacent crests $T_3$, $T_4$ of the blade and the relationship of the resilient seal assembly 72 and its seal elements 74 to the casing 45.

As shown in FIG. 3, the seal assembly 72 extends between the blade and the casing. The blade is a rotating member having an axis of rotation $A_r$. The casing is a non-rotating member but is capable of movement with respect to the blade because of the different effects of inertia loads on the casing and on the auger.

The casing has a sealing region 88 which is spaced from the blade in a radially oriented direction leaving a clearance gap G therebetween. The gap G may vary under operative conditions of the machine depending, for example, on whether the vibrations in the auger 42 are in phase with the vibrations in the casing 45.

The blade 92 has a rim. The seal assembly has a plurality of seal elements 74 extending radially outward from the blade. Each seal element is made of a resilient material which slidably engages the sealing region of the casing. Each seal element resiliently deflects in the radial direction away from the direction of rotation toward the rim of the blade, the deflection being proportional to the gap G for gaps less than or equal to the protruding length of the seal element.

Means 78 are provided for imparting vibratory movement to the casing. The vibratory means is attached to the casing 45. An example of such a means is a rotating shaft having an oscillating imbalances imparted by the shaft by weights 98 spaced radially from the axis of rotation. The shaft is rotatably supported.

A first bracket 100 and a second bracket 102 which extend laterally from the casing. Preferably, the imbalance acts in the vertical direction to cause the casing to oscillate up and down with a vibratory motion. The vibratory movement is transmitted from the casing to the media such that the media moves with respect to an article disposed within the media and with respect to the casing.

As shown in FIG. 3, the media 30 will generate circulation patterns which are dependent on the volume of media in the chamber and occupy a region which is a function of the volume and operative conditions of the apparatus. At a given frequency for a given type of media and amplitude of vibration, media of a volume which is bounded by the region $R_1$ has a circulation pattern $C_1$. The media within the region $R_1$ is not piled so high that the volume engages the shaft of the auger.

Adding a slightly greater volume of media to a chamber causes the media to assume the outline shown in region $R_2$. Thus, the region $R_2$ contains the region $R_1$ as well and some additional volume of media. The media in region $R_2$ engages the lower half of the rotor shaft. Experience has shown that media in region $R_1$ below the shaft and in region $R_2$ below the top half of the shaft will have a circulation pattern shown by the arrows designated $Z_1$. Adding an additional amount of media to bring the volume above the bottom half of the rotor shaft makes more and more likely the establishment of a secondary circulation zone $Z_2$ (and makes it nearly certain above the shaft), as shown by the arrows marked $Z_2$. It is likely that an article disposed in the media will move from the primary circulation zone to any secondary circulation zone at the top of the media.

FIG. 4 is a partial perspective view of the auger 42 showing the shaft 44, the helicoid-type blade attached to the shaft and four of the adjacent peaks $T_1$, $T_2$, $T_3$ and $T_4$. The blade has bottom portions 68$a$, 68$b$ which bound the chamber $Ch_1$ and has bottom portions 68$b$, 68$c$ between $T_2$, $T_3$ and $T_4$ which bound the chamber $Ch_2$ in the lateral direction and prevent longitudinal movement of the finishing media between adjacent chambers.

FIG. 4 also shows the rim region 92 of a portion of the blade showing the relationship of the components which form one embodiment of the resilient seal assembly 74. The rim region 92 of the blade has a plurality of holes for receiving a nut and bolt assembly at each hole, as represented by the hole 104 and the bolt 106. A seal carrier member 108 having a plurality of axially oriented slots 112 is attached to the rim.

A plurality of seal elements extend radially outwardly from the blade with one seal element at each slot, as represented by the three seal elements 74. Each seal element has a root 114 which adapts the seal element to engage an associated slot in the blade. Each seal element has a seal flap 116 of resilient material which extends radially outwardly from the root and which adapts the seal element to slidably engage the sealing region 88 of the casing which is broken away for clarity. A side plate 118 and the seal carrier member 108 axially trap the seal elements.

As will be realized, the rim region of the blade might be a one-piece construction having a plurality of slots, eliminating the need for a seal carrier. The seal elements are easily replaced by loosening the side plate, to change the spacing of seal elements or to replace worn or damaged seal elements.

FIG. 5 is an enlarged, exploded view of a portion of the blade 66 and seal assembly 72 shown in FIG. 3 showing the relationship of the rim region 92, the seal carrier member 108 and the side plate 118 which are attached to the rim region by the nut and bolt combination 106. The seal flaps 116 are spaced circumferentially apart one from the other leaving a circumferential gap $S_g$ therebetween.

FIG. 6 is an enlarged view of one of the seal elements 74 shown in FIG. 5. The seal flap 116 of the seal element has a width W in the circumferential direction. The spanwise height H is greater than or equal to six times the width W (H≧6W) and in one satisfactory construction is approximately ten times the width W. The seal flap has an axial length L which is greater than or equal to three times the width (L≧3W) and in one satisfactory construction was equal to 4W. The width $W_r$ of the root is greater than the width W of the flap. In one satisfactory embodiment, the auger 42 and casing 45 were coated with a resilient coating of Urethane available from the Ultramatic Equipment Company having a durometer hardness rating of 90. The flap material was made of a Urethane elastomeric material available from the Airex Rubber Products Corporation, 100 Indian Hill Avenue, Portland Conn. and designate as Urethane material A-6040-R. Preferably the hardness of the Urethane flap is less than the hardness of the Urethane liner of the vibratory casing and auger to minimize auger and liner surface wear.

In one embodiment, the diameter of the auger about the axis of the shaft in the rest position was approximately nineteen inches (19"). A clearance gap G of three quarters of an inch ($\frac{3}{4}$") was provided between the rim region 92 of the blade and the surface of the casing in the circular section at the bottom of the casing. The expected vibration was fairly large, plus or minus one quarter of an inch in the vertical direction. Accordingly the actual operative gap between the blade and the resilient surface of the casing was expected to lie in a range of one quarter to one and a quarter inches ($\frac{1}{4}$"–1$\frac{1}{4}$"). The length of the flap extending from the surface of the blade was one and a quarter inches (1$\frac{1}{4}$"). The circumferential spacing between adjacent flaps $S_g$ was equal to one quarter of an inch.

Figure 7:
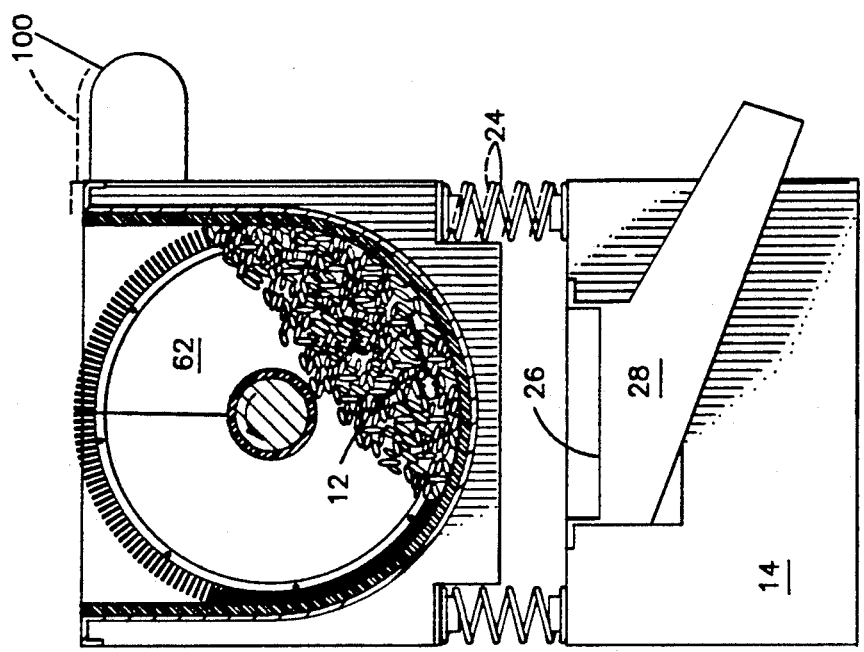
FIG. 7 is a view of the apparatus shown in FIG. 1 taken along the lines 7—7, partially broken away to show a portion of the helicoid-type blade, the resilient surface of the casing and a media disposed in the casing with a turbine blade disposed in the media.

FIG. 7 is an end view taken generally along the lines 7—7 of FIG. 1 with a portion of the apparatus 10 broken away for clarity. As shown in FIG. 7, the auger rotor is rotating about its axis at a rate of about one revolution every three to five minutes (0.2–0.33 rpm) and at the same time, the rotor shaft 96 and its eccentric weight 98 are spinning about its axis imparting a vertical movement of approximately a quarter of an inch as shown by the dotted lines in FIG. 7 and the double headed arrows which are exaggerated for clarity.

Figure 8:
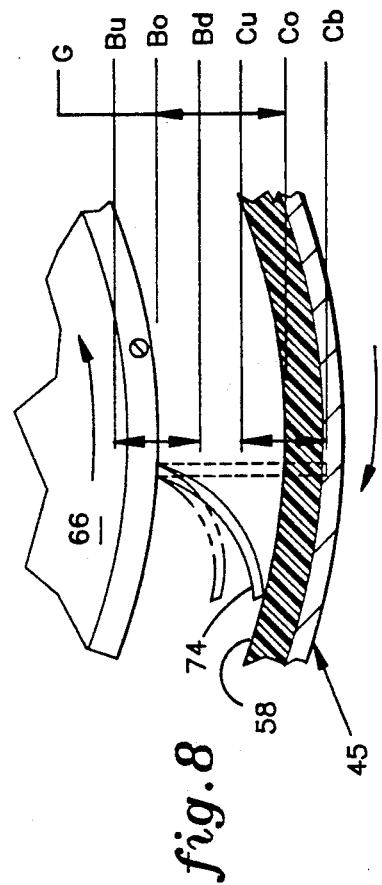
FIG. 8 is an enlarged view of a portion of the seal assembly and adjacent structure shown in FIG. 3 to show the relationship of elements of the seal assembly as the apparatus of FIG. 1 is vibrated in the vertical direction.

FIG. 8 shows the effect of relative vibrational movement of the helicoid-like blade 66 with respect to the casing inner surface 58. The blade has a rest position $B_o$ and the casing surface has a rest position $C_o$. At the rest position, the seal element is resiliently deflected as shown by the seal element in full. During a vibration of plus or minus $V_a$ from the rest positions, and as the auger vibrates at a frequency which is one hundred and eighty degrees out of phase with the casing, the casing deflects radially downwardly to position $C_b$ and the blade deflects radially upwardly to position $B_u$. At these locations for the blade and the casing, the seal element extends radially outwardly its maximum length and just touches the casing surface as shown by the seal element outlined by the dotted line. Accordingly, the seal assembly provides sealing even during the maximum clearance gap G. If the vibrations are exactly in phase, the blade moves to position $B_d$ and the casing moves to position $C_u$ leaving the minimum clearance gap G therebetween. At this location the seal element deflects even further, as shown in phantom, than the seal rest position shown in full. Even though there is a circumferential clearance $S_g$ between blades, the axially stiff seal flaps prevent media or the blade from entering the variable gap G between the blade and the casing.

In an alternate embodiment of the seal assembly, the casing 45 might be a member which rotates with respect to the blade (first member) in the direction shown in FIG. 8, as shown by the clockwise arrow. In such a construction, the sealing length L extends axially and perpendicular to the relative direction of movement and provides stiffness in that direction. The width W is measured in the direction of relative movement. The height H provides flexibility to accommodate changes in the gap G.

The method for processing a plurality of articles includes disposing successive predetermined volumes of the carrier media 30 on the inner surface of the casing 58. Each volume of media is adapted to carry at least one turbine blade in the finishing media. The inner surface of the casing is a supporting surface for the media and for the turbine blade it carries. The finishing media is adapted by its contour to provide the required surface finish to the article, that is, finish edges and surfaces. One satisfactory media for turbine blades is made of silicon carbide material shaped as angle cut triangles, which are face contoured at sixty degrees (60°) and this is available from U-M Abrasives, Inc., Kennedale, Tex. as Part PMC-3186-1. Preferably, one rotor blade is disposed in each successive volume of carrier media for carrying the rotor blade in a predetermined, spaced apart relationship to the turbine blades in the adjacent volumes of media.

As the auger 42 is turned, the resilient surface 62 of the helicoid-type blade 66 acts as an inclined plane exerting an axial force against the media, forcing the media to travel its predetermined path along the resilient inner surface 58 of the casing 55. Each volume of media is trapped in its chamber Ch by the helicoid-type blade and by the flexible seal assembly 72 which extends between the blade and the inner surface of the casing.

As vibratory motion is imparted to the casing 45 and thence to the media 30, the media moves with respect to the casing and to the turbine blade. The vibratory motion causes the media to follow the circulation zone $Z_1$ for the volumes of media in regions $R_1$ and $R_2$. The turbine blade 12, which was initially placed on top of the media in the hopper 34, begins to move into the media following the circulation in zone $Z_1$. The amount of work done on the turbine blade is proportional to the pressure exerted by the media and thus to the height (or head) of media above the turbine blade. As the turbine blade reaches the bottom of the circulation zone $Z_1$ of region $R_1$, the maximum amount of work is done on the turbine blade. As the turbine blade moves up toward the top of the circulation zone, less work is done because the height (and weight of media on the turbine blade) of the media is decreasing. Then, the media and turbine blade circulate downwardly into the bottom of region $R_1$ where the maximum amount of work is done on the turbine blade.

The amount of work done on a surface is proportional to the frictional force acting on the surface. The frictional force is proportional to pressure. Accordingly, sharp edges are quickly ground down because of their small surface areas whereas large surface areas experience a small removal of material.

Filling the chamber with a volume of media which lies within the region $R_3$ overfills the chamber and is almost certainly going to cause the creation of a recirculation zone as shown by the arrows $Z_2$. Experience has shown the secondary recirculation zone may capture the turbine blades as the turbine blade moves up to the top of circulation zone $Z_1$. After the turbine blade moves into the secondary circulation zone $Z_2$, the turbine blade remains in the secondary circulation zone $Z_2$ and receives very little work because of the significantly smaller height of the secondary circulation zone. A blade which remains in the secondary circulation zone will have an unsatisfactory surface finish.

Fluid is flowed into each of the chambers Ch and drains through the media into each chamber. the fluid carries finishing compound, which acts as a soap to clean the finishing media. The fluid carries fine bits of finishing media which result from media wear and bits and slivers of metal from the turbine blade. As the fluid drains to the bottom of the chamber, the fluid is urged axially along by the auger. The fluid is also able to flow between the seal members in the gap $S_g$ near the root of the seal elements, providing a second path for removing this waste material form the processing apparatus.

A particular advantage of the present invention is that each turbine blade is isolated from the adjacent turbine blades by the bottom sides of the helicoid-type blade the seal assembly and the inner surface of the casing. Thus, each turbine blade is individually processed even though a plurality of turbine blades are flowing through the finishing apparatus.

Another advantage of the process is the turbine blade is transported between two locations in a flow line as the turbine blade is being finished by a predetermined amount of carrier media. This makes for an efficient operation, utilizing the finishing process as the transportation process for the blade and the transportation process as the finishing process for the turbine blade as it moves through an automatic flow line.

As will be realized the present method of serially finishing and transporting a plurality of turbine blades is particularly suitable for use with automatic feeding and removal operations such as might be encountered in automated flow lines for fabricating turbine blades or other articles.

Another advantage of this process is the quality of the finish on each turbine blade which results from avoiding one turbine blade striking an adjacent blade as occurs in operations in which there is no segregation of turbine blades from the adjacent blades. In addition, quality is enhanced by maintaining the height of media at a constant amount and results from finishing the blade in a predetermined volume of media. The segregation of the blades is accomplished with no decrease in the efficiency of the process and avoids time consuming removal operations or shut downs of the machines as a first batch of turbine blades are removed from the finishing media and a new batch of turbine blades are disposed in the media.

Although the invention has been shown and described with respect to detailed embodiment thereof, it should be understood by those skilled in the art that various changes in form and detail thereof may be made without departing from the spirit and scope of the claimed invention.

We claim:

1. A seal assembly which extends between two members having facing surfaces which are separated by a gap G, the seal assembly being adapted to block the movement of medium between the surfaces, the two facing surfaces being capable of relative movement in a first direction which comprises:
   a plurality of seal elements, each seal element having a flap aligned with the adjacent flap in the direction of movement, each flap extending from the first member and having an average width W as measured in the direction of relative movement, an average height H measured from the surface of the first member and a sealing length L measured perpendicular to the direction of movement and parallel to the surfaces;
   wherein the width is generally oriented in a direction which faces the medium to be sealed, the height H of each flap is greater than the sealing length L and the sealing length L is greater than the width W to provide stiffness perpendicular to the direction of movement to block movement of the medium and flexibility to accommodate changes in the gap G between the surfaces and wherein the flaps are replaceably fixed to the first member.

2. The seal assembly of claim 1 wherein the first member is rotatable about an axis in the first direction and extends circumferentially with respect to the second member, is separated by a radial gap G from the second member, and has a plurality of axially extending slots, each of which adapt the first member to receive the root of the associated seal element.

3. The seal assembly of claim 2 wherein the length L is greater than or equal to three times the width W ($L \geq 3W$) and the height H is equal or greater than six times the width W ($H \geq 6W$).

4. An apparatus having a seal assembly extending between a rotating member having an arc of rotation and a non-rotating member having a sealing region which is spaced from the non-rotating member in a radially oriented direction having a gap G therebetween, which comprises:
   a rotating member having a rim and a plurality of slots spaced circumferentially about the rim of the member, the slots extending in an axially oriented direction;
   a plurality of seal elements extending radially outwardly from the rotating member one at each slot, each seal element having
   a root which adapts the seal element to engage the associated slot in the rotating element;
   a seal flap of a resilient material which extends radially outwardly from the root to slidably engage the sealing region of the non-rotating member, the seal flap having a width W in the circumferential direction, a spanwise height H which is greater than or equal to six times the width W ($H \geq 6W$), and an axial length which is greater than or equal to three times the width W of the seal member;
   wherein a space $S_g$ extends between adjacent flaps which is less than or equal to three times the width W and wherein the length L is in a range of one and a half to two and a half times the gap G of the sealing region of the non-rotating member, the seal flap having a resistance to deflection in the radial direction which is less than the resistance to deflection in the axial direction which causes the seal to be relatively stiff in the axial direction and relatively flexible in the radial direction.

5. The apparatus of claim 4 wherein the apparatus is a screw conveyor, the non-rotating member is a casing for receiving material and the rotating member is a helicoid-type blade which is rotatably supported within the casing.

6. The apparatus of claim 5 wherein the screw conveyor has an auger having a shaft and the helicoid-type blade is attached to the shaft.

* * * * *